United States Patent
Armijo

(10) Patent No.: US 10,780,621 B2
(45) Date of Patent: Sep. 22, 2020

(54) QUICK-CHANGE FUSED FILAMENT FABRICATION NOZZLE ASSEMBLY

(71) Applicant: AREVO, INC., Santa Clara, CA (US)

(72) Inventor: Armando Armijo, San Diego, CA (US)

(73) Assignee: AREVO, INC., Santa Clara, CA (US)

( * ) Notice: Subject to any disclaimer, the term of this patent is extended or adjusted under 35 U.S.C. 154(b) by 119 days.

(21) Appl. No.: 16/001,013

(22) Filed: Jun. 6, 2018

(65) Prior Publication Data

US 2019/0375141 A1    Dec. 12, 2019

(51) Int. Cl.

| | |
|---|---|
| *B29C 64/118* | (2017.01) |
| *B29C 64/209* | (2017.01) |
| *B29C 48/25* | (2019.01) |
| *B29C 48/05* | (2019.01) |
| B29L 31/00 | (2006.01) |
| B33Y 30/00 | (2015.01) |
| B29C 48/86 | (2019.01) |

(52) U.S. Cl.
CPC ......... *B29C 48/2562* (2019.02); *B29C 48/05* (2019.02); *B29C 48/2565* (2019.02); *B29C 48/2566* (2019.02); *B29C 64/118* (2017.08); *B29C 64/209* (2017.08); *B29C 48/86* (2019.02); *B29L 2031/731* (2013.01); *B33Y 30/00* (2014.12)

(58) Field of Classification Search
CPC . B29C 48/2562; B29C 48/05; B29C 48/2565; B29C 48/2566; B29C 48/86; B29C 64/209; B29C 64/118
See application file for complete search history.

(56) References Cited

U.S. PATENT DOCUMENTS

| | | | | |
|---|---|---|---|---|
| 2015/0290861 | A1* | 10/2015 | Douglass | B29C 48/92 264/255 |
| 2017/0190108 | A1* | 7/2017 | Holland | B33Y 10/00 |
| 2018/0326743 | A1* | 11/2018 | Lee | B33Y 30/00 |

* cited by examiner

*Primary Examiner* — Joseph S Del Sole
*Assistant Examiner* — Mohamed K Ahmed Ali
(74) *Attorney, Agent, or Firm* — Botos Churchill IP Law LLP; Robert P Marley; Sujatha Vathyam

(57) ABSTRACT

The present invention provides a system and method for quickly removing and installing a filament tube and nozzle in an FFF extrusion system. The system utilizes a primary manifold that includes a cooling block, a heating block and a quick-change mechanism. This primary manifold is adapted to mate a filament tube/nozzle assembly. The quick-change mechanism, which in a particular embodiment utilizes a recessed biased-bearing arrangement, enables the filament/nozzle assembly to be removed and inserted without the use of any tools, and without causing any significant downtime for the FFF extrusion system. Once removed, the filament tube/nozzle assembly can be refurbished by a technician, trained so as not to over torque the tube/nozzle threaded interface. This refurbishment (typically consisting of a cleaning and the installation of a new nozzle) could be accomplished "off-line", without any impact on the continued use of FFF extrusion system.

27 Claims, 5 Drawing Sheets

QUICK-CHANGE FUSED FILAMENT FABRICATION NOZZLE ASSEMBLY

FIELD OF THE INVENTION

The present invention relates generally to fused filament fabrication, and more specifically to the filament tubes and extrusion nozzles employed in such fabrication systems and processes.

BACKGROUND OF THE INVENTION

The additive manufacturing process is widely known as "3D printing." Numerous 3D-printing methodologies have been described in prior art, the most common being solid-laser sintering (SLS), stereolithography (SLA), and extrusion-based 3D printing or fused filament fabrication (FFF).

All of these methods involve depositing a thin layer of thermoplastic or thermoset materials. In FFF, thin strands of material (referred to herein as "extrudate") are deposited from a deposition nozzle onto a build surface. As the filament moves through the FFF system, it undergoes mechanical, chemical, and thermal changes. Deposition proceeds in a controlled pattern on the build surface to construct a 3D object.

In operation of an FFF system, a filament of material is fed into a nozzle manifold via a motorized feed system from a supply spool. This spooled material is typically at room temperature in a solid state. Typically, the filament moves through the manifold into a cooling block, and then a heating block. As the filament moves through the heating block, it is heated above a melting temperature. Once melted, the polymer is in a completely liquid, free-flowing state and exits the nozzle.

Once the liquefied polymer (extrudate) reaches the build surface (or is deposited on already-deposited layers of extrudate), it cools below its crystallization temperature. If the build chamber and build platform are maintained at the appropriate temperature, the polymer chains in the extrudate begin to order and align before completely solidifying. Once the build is complete, the polymer cools down to room temperature.

A typical FFF extrusion assembly is shown in FIGS. 1A-1C. These cross-sectional views show filament tube 102 passing through upper manifold assembly 104, cooling block 106 and heating block 108. The extrudate travels through filament tube 102, past the cooling and heating blocks, and into nozzle 110. Nozzle 110 provides the final mechanical conduit for the extrudate as it exits to form the build. The mechanical stability of the nozzle is essential for maintaining a uniform, continuous extrudate flow. Not surprisingly, as the hot extrudate exits the nozzle it can abrade the interior nozzle surfaces. The level of abrasion varies depending upon the chemical and mechanical properties of the particular extrudate being utilized, but over time the nozzle will invariably become worn. This wear results in the loss of the mechanical integrity of the nozzle exit aperture 112 (typically a 0.2-0.5 mm bore) and can cause unwanted variability in extrudate consistency/diameter, as well as nozzle clogging. Consequently, normal maintenance of an FFF system requires the periodic replacement of the nozzle.

In most FFF systems, nozzle replacement requires the shut-down of the system, and the manual removal of the worn nozzle. A typical FFF nozzle has a threaded upper portion 114 that is screwed into similarly threaded female receptacle within the filament tube 116. Removing a worn nozzle requires the use of hand-tools, such as a fixed wrench, to apply a torque 118 to the nozzle (and consequently the filament tube) so as to loosen the threaded connection and unscrew the nozzle. The new nozzle 120 is then torqued 122 onto filament tube 102. This process may also include manually clearing of the filament tube of any extrudate and applying an anti-seize compound to the threads of the new nozzle, prior to nozzle installation. In general, FFF nozzle replacement is time-consuming process that results in unwanted FFF system down-time and can expose the system's filament tube to excessive amounts of torque from manually wrenching the nozzle both out of and in to place. Such torquing can cause unwanted deformation of the filament tube and surrounding components.

A need therefore exists for a system and method to provide a reliable means of quickly removing and replacing an FFF nozzle in a manner resulting in minimal down-time for an FFF system and the exposure of the nozzle and filament tube to properly limited amount of torque.

BRIEF SUMMARY OF THE INVENTION

The present invention provides a system and method for quickly removing and installing a filament tube and nozzle in an FFF extrusion system. The system utilizes a primary manifold that includes a cooling block, a heating block and a quick-change mechanism. This primary manifold is adapted to mate a filament tube/nozzle assembly. The quick-change mechanism, which in a particular embodiment utilizes a recessed biased-bearing arrangement, enables the filament/nozzle assembly to be removed and inserted without the use of any tools, and without causing any significant downtime for the FFF extrusion system. Once removed, the filament tube/nozzle assembly can be refurbished by a technician, trained so as not to over torque the tube/nozzle threaded interface. This refurbishment (typically consisting of a cleaning and the installation of a new nozzle) could be accomplished "off-line", without any impact on the continued use of FFF extrusion system.

BRIEF DESCRIPTION OF THE DRAWINGS

The features, aspects, and advantages of the present invention will become better understood with regard to the following description, appended claims, and accompanying drawings in which:

DETAILED DESCRIPTION

Figure 1C:
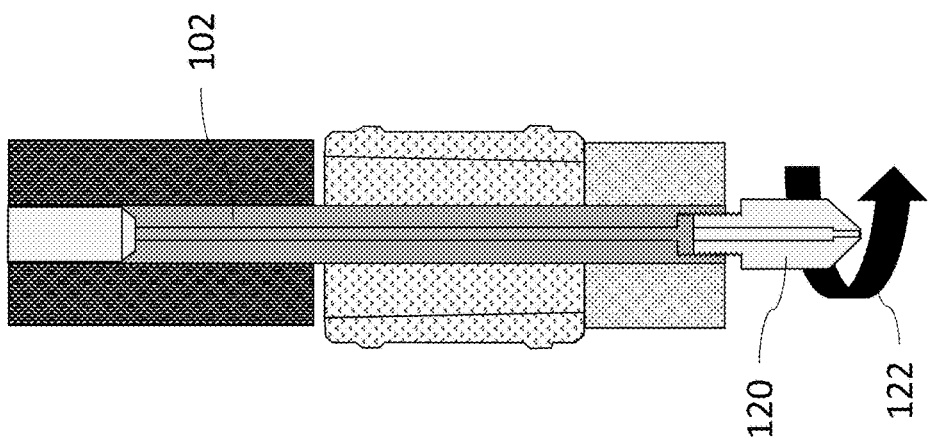
FIGS. 1A-1C are cross-sectional views of a prior art extrusion assembly.
Figure 1B:
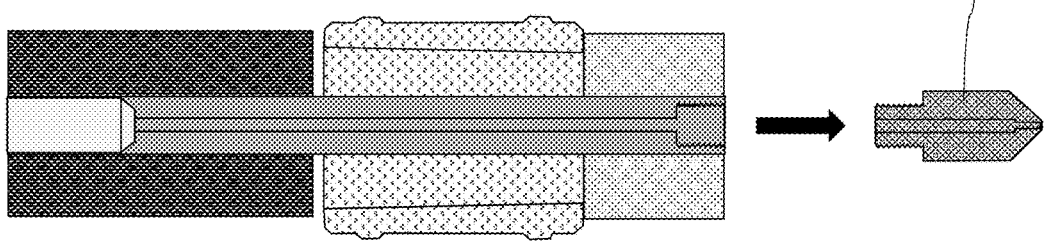
Figure 1A:
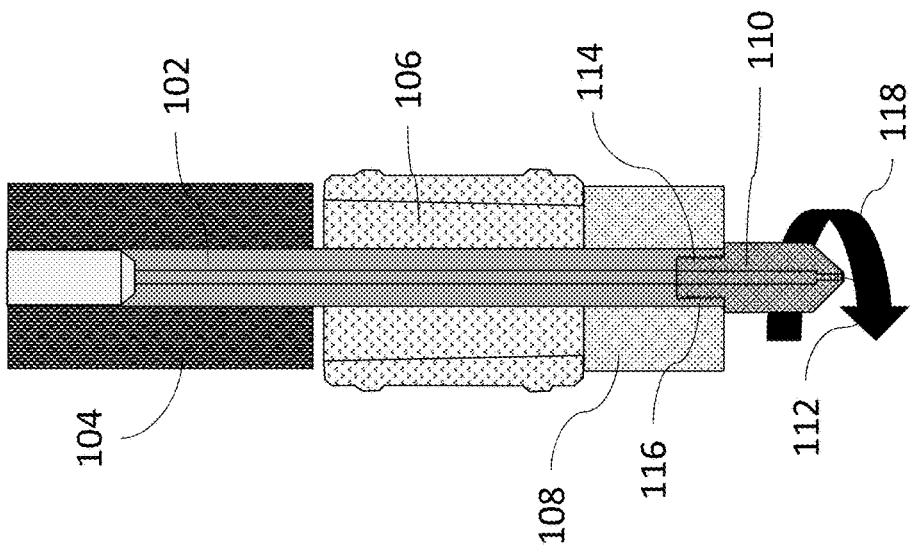
Figure 2A:
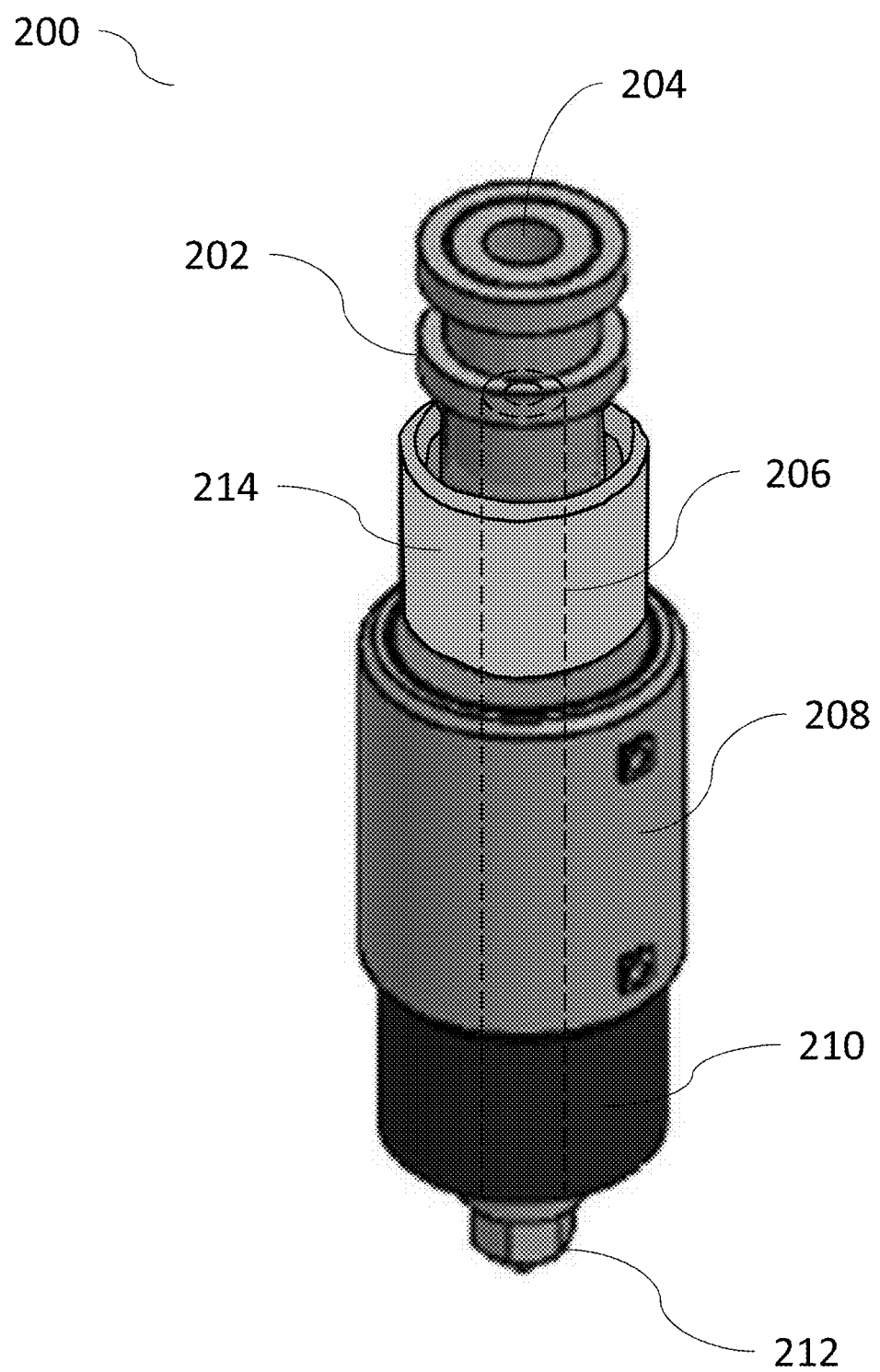
FIG. 2A is a perspective view of an extrusion assembly in accordance with an embodiment of the invention.

FIG. 2A a perspective view of an FFF extrusion assembly in accordance with a particular embodiment of the present disclosure. As illustrated, assembly 200 includes coupler 202, which facilitates attachment of the assembly to an FFF system and a supply of filament which is fed down orifice 204 and into the assembly's filament tube 206. Filament tube 206 (represented by the dashed lines) is internal to the extrusion assembly and positioned along the assembly's central axis. Cooling block 208 and heating block 210 are situated coaxially along the filament tube, and nozzle 212 is attached to lower end of filament tube 206. Quick-change mechanism 214 is shown to be coaxially situated above cooling block 208.

Figure 2B:
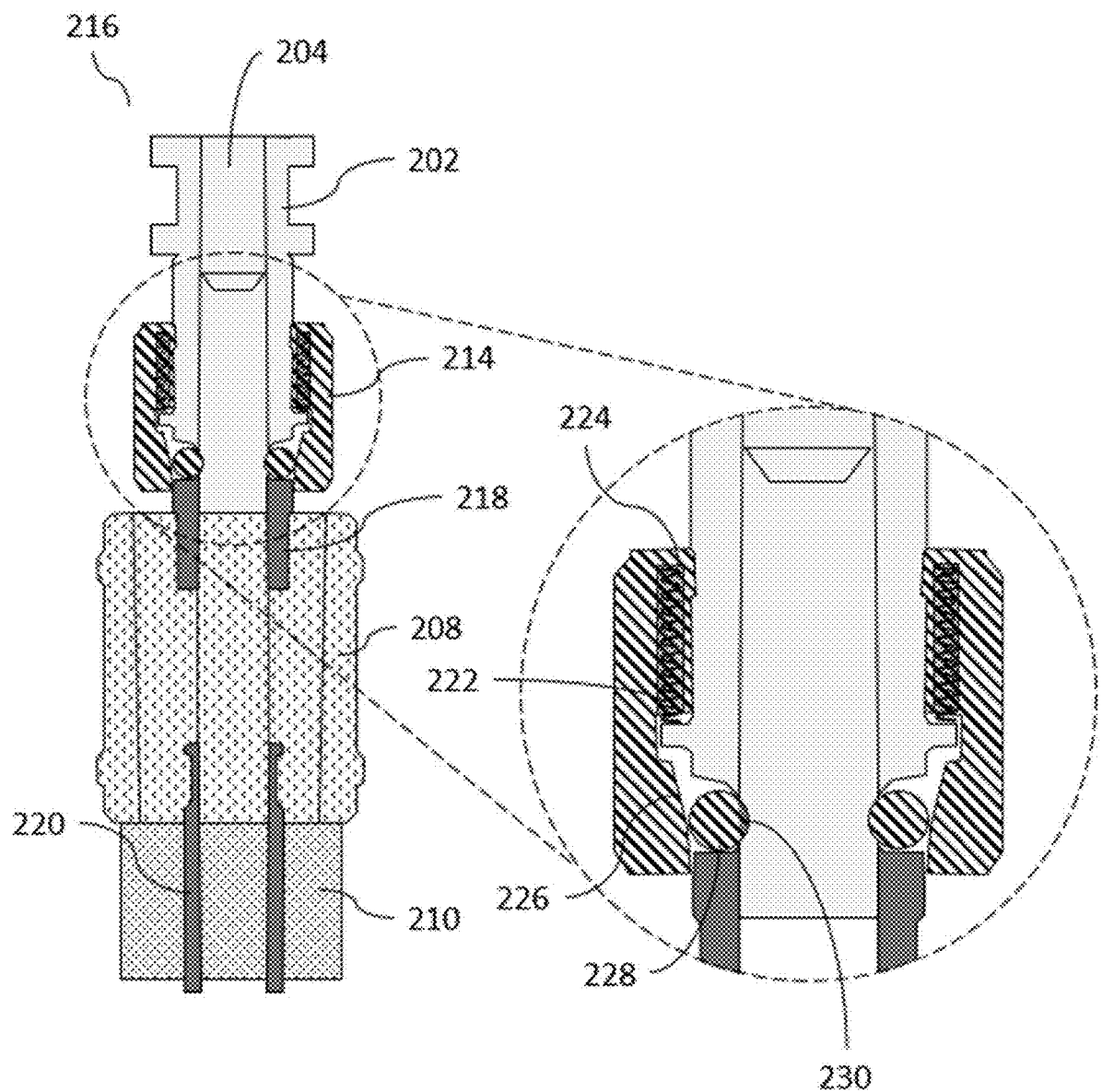
FIG. 2B is a cross-sectional view of the primary manifold of the extrusion assembly of FIG. 2A.

FIG. 2B provides a cross-sectional view of the primary manifold 216 of extrusion assembly 200. As shown, coupler 202 is connected to cooling block 208 by connecting ring 218, and cooler block 208 is connected to heating block 210 by connecting ring 220. Quick-change mechanism 214 is shown to be movably-mounted upon primary manifold 216 so that it may translate along the manifold's primary axis. At least one engagement tab is mechanically linked to the quick-change mechanism 214. In one embodiment, the at least one engagement tab is at least one bearing 228. Springs 222 are positioned within chambers 224 so as to bias quick-change mechanism 214 against coupler 202, and thereby maintain quick-change mechanism in an upward position. In this position, the internal sloping wall 226 of the outer ring of quick-change mechanism 214 presses against bearings 228 forcing them inward so that a portion 230 of each bearing protrudes into the central axial cavity of primary manifold 216. Although only two bearings are depicted in the cross-sectional diagram of FIG. 2B, it will be understood that such a quick-change mechanism may include larger numbers of bearings radially positioned about the mechanism. Each bearing being similarly pressed upon by internal sloping wall 226 and protruding into the central axial cavity of primary manifold 216 when quick-change mechanism 214 is biased in an upward position.

Figure 2C:
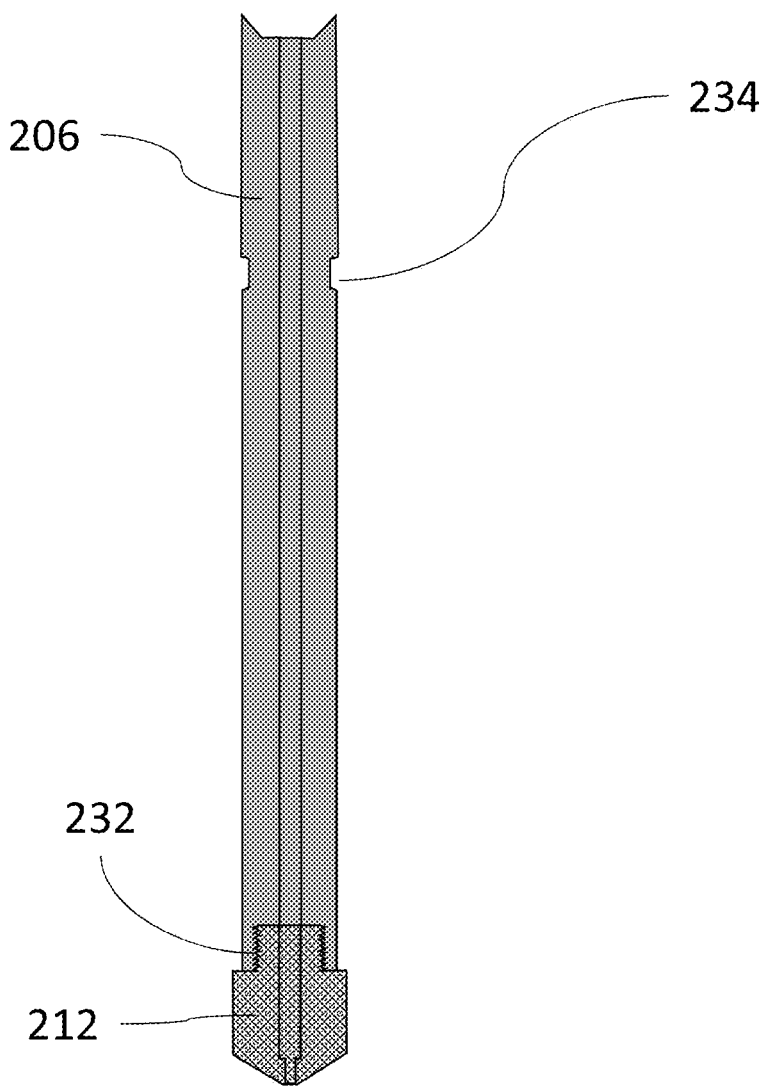
FIG. 2C is a cross-sectional view of the filament tube/nozzle assembly of the extrusion assembly of FIG. 2A.
Figure 2D:
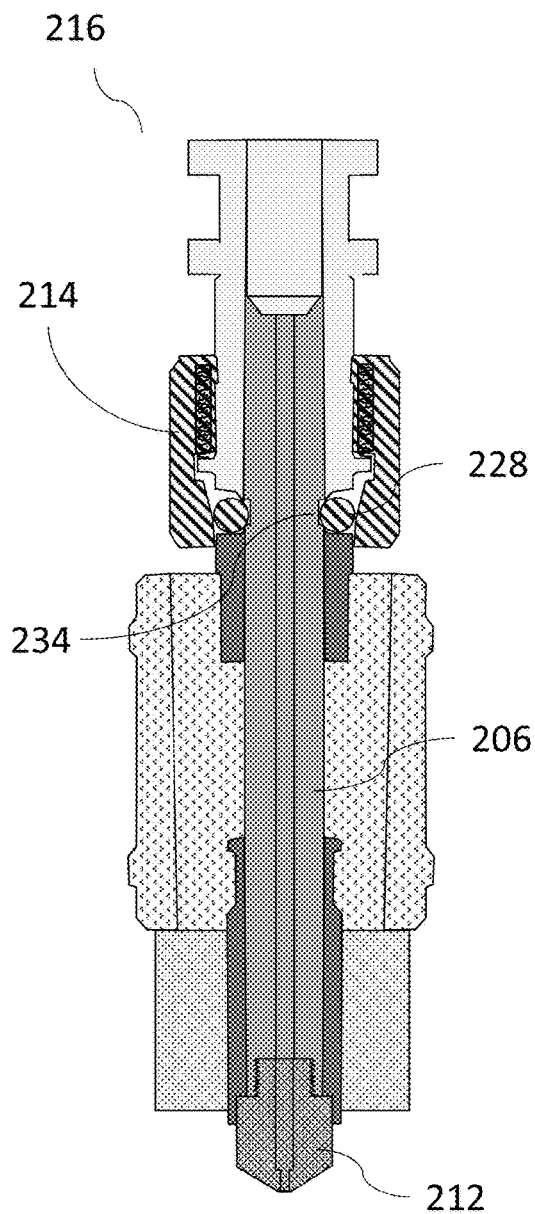
FIG. 2D is a cross-sectional view of the extrusion assembly of FIG. 2A showing the quick-change mechanism in an engaged state.

FIG. 2C is a cross-sectional view of the filament tube 206 and nozzle 212 of extrusion assembly 200. Nozzle 212 is coupled to filament tube 206 via threaded region 232. This mechanical coupling is capable of withstanding the pressure exerted upon the nozzle during the extrusion process and provides good thermal coupling between the nozzle and the filament tube. Filament tube 206 is also shown to have radial detent 234. Radial detent 234 is positioned along the axis of filament tube 206 so that it aligns with bearings 228 when filament tube 206 is inserted into the central axial cavity of primary manifold 216 (see FIG. 2D). As shown in FIG. 2D, when quick-change mechanism is in the upward position, bearings 228 are pushed inward and protrude into the central axial cavity of primary manifold 216 to engage with radial detent 234. This mating secures filament tube 206/nozzle 212 assembly in place.

Figure 2E:
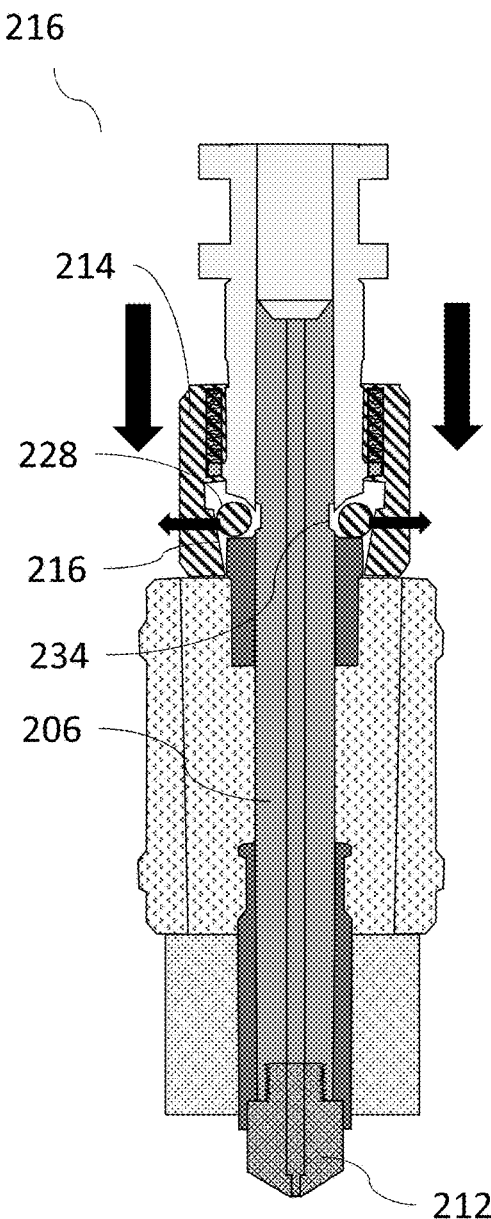
FIG. 2E is a cross-sectional view of the extrusion assembly of FIG. 2A showing the quick-change mechanism in a disengaged state.

Filament tube 206/nozzle 212 can be quickly released from primary manifold 216 by depressing quick-change mechanism 214 downward, as shown in FIG. 2E. This results in the translating internal sloping walls 216 downward with respect to bearings 228, effectively opening up a space within quick-change mechanism 214 behind each bearing 228. This space permits the bearings to move radially outward and disengage from radial detent 234 so as to permit filament tube 206/nozzle 212 assembly to be removed from primary manifold 216. A replacement filament tube/nozzle can then be inserted and secured as quick-change mechanism 214 is biased back to an upward position and bearings 228 engage the radial detent of the replacement assembly.

By enabling the quick release and changing of the filament tube/nozzle assembly, the invention enables a new nozzle to be brought into service with a minimal FFF system downtime. Once removed, the filament tube/nozzle assembly could be refurbished by a technician, trained so as not to over torque the tube/nozzle threaded interface. This refurbishment (typically consisting of a cleaning and the installation of a new nozzle) could be accomplished "off-line", without any impact on the continued use of FFF system.

The changing procedure requires no tools, no particular expertise. Consequently, it is a process that could be readily automated. With little or no modification, the disclosed quick-change mechanism could be actuated by a robotic arm. Similarly, the removal and/or insertion of a filament tube/nozzle assembly is also a process that could be accomplished with the presently available industrial robotic and machine vision systems.

Although the invention herein has been described with reference to particular embodiments, it is to be understood that these embodiments are merely illustrative of the principles and applications of the present invention. For example, a differently configured engagement tabs, operating in a manner similar to the biased bearings, could be used to secure/release the filament tube/nozzle assembly within the primary manifold, such as a biased arrangement of rectangular pegs, or cylindrical pins. The detent(s) on the filament tube/nozzle assembly could be modified to mate with these differently configured engagement tabs. It is therefore to be understood that numerous modifications may be made to the illustrative embodiments and that other arrangements may be devised without departing from the spirit and scope of the present invention as defined by the appended claims.

What is claimed is:

1. An extrusion assembly comprising:
   a primary manifold having a central axial cavity;
   a change mechanism mounted upon the primary manifold, the change mechanism having a first position and a second position;
   at least one engagement tab mechanically linked to the change mechanism and positioned to protrude into the central axial cavity when the change mechanism is in the first position, and to retract from the central axial cavity when the change mechanism is in the second position; and
   a filament tube, having a proximal end and distal end, the proximal end being adapted for insertion within the central axial cavity, so that a portion of the filament tube is positioned within the central axial cavity, and having at least one surface detent on a portion of the filament tube adapted to be positioned within the central axial cavity, the surface detent being positioned so that it is engaged by the at least one engagement tab when the change mechanism is in the first position, and disengaged from the at least one engagement tab when the change mechanism is in the second position.

2. The extrusion assembly of claim 1, wherein the primary manifold comprises a cooling block.

3. The extrusion assembly of claim 1, wherein the primary manifold comprises a heating block.

4. The extrusion assembly of claim 1, wherein the central axial cavity is cylindrical.

5. The extrusion assembly of claim 1, wherein the at least one engagement tab is substantially spherical.

6. The extrusion assembly of claim 1, wherein the change mechanism is secured in the first position by a biasing means.

7. The extrusion assembly of claim 6, wherein the biasing means comprises at least one spring.

8. The extrusion assembly of claim 1, wherein an extrusion nozzle is affixed to the distal end of the filament tube.

9. The extrusion assembly of claim 8, wherein the extrusion nozzle is affixed to the filament tube by a threaded coupling.

10. A process for engaging an extrusion system filament tube comprising:

in an extrusion assembly, comprising a primary manifold having a central axial cavity, a change mechanism having a first position and a second position and mounted upon the primary manifold, at least one engagement tab mechanically linked to the change mechanism and positioned to protrude into the central axial cavity when the change mechanism is in the first position, and to retract from the central axial cavity when the change mechanism is in the second position, and a filament tube having a proximal end, a distal end and at least one surface detent;

inserting the proximal end of the filament tube into the central axial cavity so as to align the surface detent with the at least one engagement tab; and placing the change mechanism in the first position so as to engage the surface detent with the at least one engagement tab.

11. The process of claim 10, wherein the primary manifold comprises a cooling block.

12. The process of claim 10, wherein the primary manifold comprises a heating block.

13. The process of claim 10, wherein the central axial cavity is cylindrical.

14. The process of claim 10, wherein the at least one engagement tab is substantially spherical.

15. The process of claim 10, wherein the change mechanism is secured in the first position by a biasing means.

16. The process of claim 15, wherein the biasing means comprises at least one spring.

17. The process of claim 10, wherein an extrusion nozzle is affixed to the distal end of the filament tube.

18. The process of claim 17, wherein the extrusion nozzle is affixed to the filament tube by a threaded coupling.

19. A process for disengaging an extrusion system filament tube comprising:

in an extrusion assembly, comprising a primary manifold having a central axial cavity, a change mechanism having a first position and a second position and mounted upon the primary manifold, at least one engagement tab mechanically linked to the change mechanism and positioned to protrude into the central axial cavity when the change mechanism is in the first position, and to retract from the central axial cavity when the change mechanism is in the second position, and a filament tube having a proximal end, a distal end and at least one surface detent, wherein the proximal end of the filament tube is inserted into the central axial cavity so that the surface detent is aligned with and be engaged by the at least one engagement tab;

placing the change mechanism in the second position so as to disengage the at least one engagement tab from the surface detent; and removing the filament tube from the central axial cavity.

20. The process of claim 19, wherein the primary manifold comprises a cooling block.

21. The process of claim 19, wherein the primary manifold comprises a heating block.

22. The process of claim 19, wherein the central axial cavity is cylindrical.

23. The process of claim 19, wherein the at least one engagement tab is substantially spherical.

24. The process of claim 19, wherein the change mechanism is secured in the first position by a biasing means.

25. The process of claim 24, wherein the biasing means comprises at least one spring.

26. The process of claim 19, wherein an extrusion nozzle is affixed to the distal end of the filament tube.

27. The process of claim 26, wherein the extrusion nozzle is affixed to the filament tube by a threaded coupling.

* * * * *